Sept. 5, 1967    D. K. CLASH ET AL    3,339,891

VEHICLE WHEEL LIFTING DEVICE

Filed Dec. 7, 1966

INVENTORS:
DOUGLAS K. CLASH,
GEORGE POPP,
BY  *Elliott & Pastoriza*

ATTORNEYS.

3,339,891
VEHICLE WHEEL LIFTING DEVICE
Douglas K. Clash, Torrance, Calif., and George Popp, Miami, Fla., assignors of fifteen percent to Jack D. McGehee, Redondo Beach, Calif., and five percent to Edmund L. Foard, Inglewood, Calif.
Substituted for abandoned application Ser. No. 358,228, Apr. 8, 1964. This application Dec. 7, 1966, Ser. No. 617,733
2 Claims. (Cl. 254—94)

ABSTRACT OF THE DISCLOSURE

This disclosure describes a bowed plate structure for attachment to a vehicle wheel to facilitate moving the vehicle when the vehicle is stuck in the mud. The design is such that driving the vehicle will rotate the rear wheel and result in the wheel riding up on the plate to lift the wheel free of mud or other ground area.

---

This is a substitute for abandoned application No. 358,228, filed Apr. 8, 1964.

When vehicles such as automobiles, trucks, farm tractors, and the like become stuck, it is a somewhat complicated process to free the vehicle. When the wheels are embedded in mud, slime, snow or equivalent material, a lengthy digging process is usually necessary to free the wheels. Even during such digging, the removed mud and soil tends to fall back into the ditch or other holes in which the wheel is stuck.

In many instances, the vehicle may be freed by jacking it up and inserting planks under the wheel. Once the wheel has a steady platform on which to ride, it is a simple matter to drive the vehicle away. This jacking up process, however, is time consuming and, furthermore, is not always easily carried out since a stable platform for the jack close to the wheel may not be available.

With all of the foregoing in mind, it is accordingly a primary object of this invention to provide a novel wheel lifting device serving as a substitute for a jack to facilitate freeing a vehicle when stuck.

More particularly, it is an object to provide a device which may very easily be attached to a wheel without the necessity of any special tools and which is so designed as to cooperate with other available objects to facilitate freeing a stuck wheel.

Still other objects are to provide a vehicle wheel lifting device which is rugged, simple to use, relatively economical to manufacture, and which may be handled by one person.

Briefly, these and many other objects and advantages of this invention are realized by providing a device in the form of a bent plate member adapted to engage a peripheral portion of the vehicle wheel. Cooperating with the plate member is a flexible line such as a belt or cable arranged to encircle the peripheral portion of the wheel engaged by the plate so that the device is locked to the wheel. If now the vehicle is driven so as to rotate the wheel, the wheel will ride up on the bent plate thereby raising itself.

In the preferred form of the device, the plate includes a slightly bowed central section with ends bent out of the plane of the central section in a reverse direction to the bow. An elongated auxiliary object such as a piece of wood may serve as a base upon which one or the other of the ends ride when the wheel is rotated. This latter arrangement will prevent the wheel from simply pushing the plate further into the mud when the wheel is rotated rather than riding up on the device as desired.

A better understanding of the invention will be had by now referring to a preferred embodiment thereof as illustrated in the accompanying drawings, in which.

Figure 1:
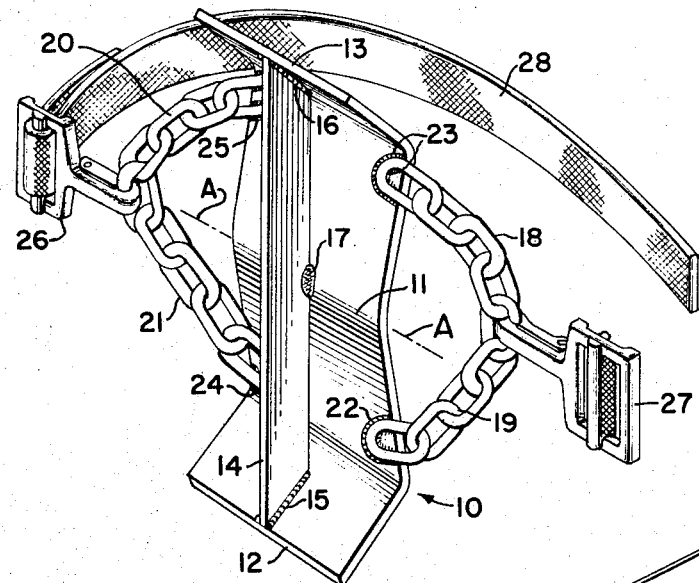
FIGURE 1 is a perspective view of the wheel lifting device.

Referring first to FIGURE 1, the device comprises a generally rectangular shaped plate member 10 having a central bowed section 11 and bent end portions 12 and 13. As shown, and bent end portions 12 and 13 extend in a direction generally away from the concave side of said central bowed section in such a manner that the member is symmetrical with respect to a transverse axis A—A passing through the center of the central bowed section.

To lend strength to the plate member, there may be provided a web 14 extending in a longitudinal direction along the convex side of the central bowed portion. As shown, the web 14 is secured at its outer ends as at 15 and 16 to the bent end portions 12 and 13 respectively and at its center to the convex side of the section 11 as at 17. The device is completed by a securing means including chain portions 18 and 19, and 20 and 21 secured respectively to opposite longitudinal sides of the central bowed section as at 22, 23, and 24, 25. These chain portions connect to a buckle means including buckles 26 and 27 cooperating with a flexible belt 28.

In the particular embodiment shown for illustrative purposes, the belt 28 comprises nylon and has an extremely high tensile strength. One end of this belt may be permanently secured as to the buckle 26, the other end being free and adjustably attachable to the opposite buckle 27.

Figure 2:
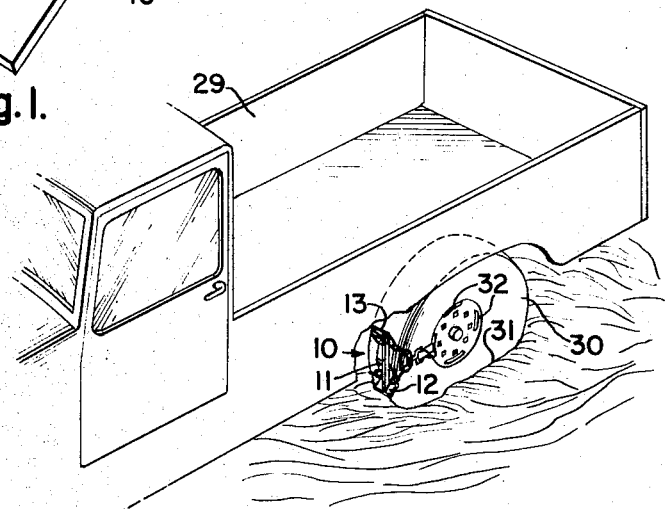
FIGURE 2 is a fragmentary perspective view of the rear end of a vehicle illustrating the manner in which the device is secured to the vehicle wheel when in a stuck position; and, FIGURE 3 is an enlarged view illustrating the manner in which the device functions to free the wheel.

Referring now to FIGURE 2, the manner in which the device 10 is secured to a vehicle wheel will be evident. As shown, a vehicle 29 is shown with a rear wheel 30 stuck in a mud hole 31. To free the wheel 30, the device 10 is positioned with the concave side of the central bowed section 11 in engagement with a peripheral portion of the wheel. The positioning is such that the bent end portions 12 and 13 extend generally away from the wheel and the transverse axis of the device is generally parallel to the axis of rotation of the wheel 30. The device is secured by passing the belt 28 through one of the conventional slots such as indicated at 32 passing through the wheel and generally disposed outwardly of the wheel lugs. The belt 28 is then securely buckled to the buckle 27 described of FIGURE 1.

In operation, after the device has been attached to the weel 30 as described in conjunction with FIGURE 2, the operator of the vehicle 29 may simply drive the vehicle forward to rotate the wheel 30. The bent end portions 12 and 13 will then successively engage the ground and serve to lift the wheel 30 from the mud hole 31.

In conjunction with the foregoing, it should be noted that as a consequence of the symmetry of the plate member, it is possible to secure it to the rear peripheral portion of the wheel 30 and back the vehicle or rotate the wheel 30 in an opposite direction to thereby lift the same from the mud hole 31.

Figure 3:
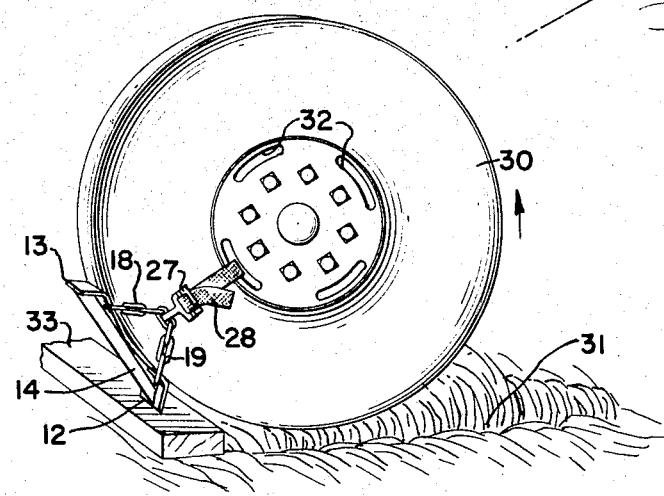

The design of the plate member is such that an auxiliary stabilizing support base such as a plank may be used in conjunction with the device. Thus, referring particularly to FIGURE 3, there is shown a plank 33 positioned across the mud hole in such a manner that when the vehicle is driven forwardly, the end edge of the bent end portion 12 engages the plank and thus a stable platform is provided to effect the raising of the wheel 30. By insuring that the extreme edges of the bent end portions extend generally parallel to the transverse axis A—A, a stable surface contact with the plank 33 will be provided.

Once the wheel of the vehicle has been raised, which only requires approximately one-quarter turn, the vehcile may be stopped and further planking may be disposed beneath the wheel. The vehicle may then be rolled back on the added planking or forward onto such planking. After this operation, the wheel lifting device may be removed.

From the foregoing description, it will be evident that a device has been provided which serves in one manner of speaking, the equivalent function of a jack in that it will raise the wheel. However, the power entailed for raising the wheel is derived from the vehicle engine itself. As a consequence, the lifting device can be made inexpensively, of rugged construction, and can be easily used by one person. No tools whatsoever are required to attach the device in view of the simple belt and belt buckle construction.

It will be understod that a second device may be provided and secured to the other rear wheel if both wheels are stuck and a four wheel drive for the vehicle is provided.

While only one particular embodiment of the invention has been shown and described, various changes that fall clearly within the scope and spirit of the invention will ocur to those skilled in the art. The vehicle lifting device is therefore not to be thought of as limited to the one embodiment set forth merely for illustrative purposes.

What is claimed is:

1. A device adapted to be secured to a peripheral portion of a vehicle wheel to lift said wheel when said wheel is rotated, said device comprising: a generally rectangular plate member having a central bowed section and bent end portions extending away from the concave side of said central bowed section; said member being symmetrical with respect to a transverse axis passing through said central bowed section; a web extending longitudinally along the convex side of said central bowed section, the outer ends of said web being secured to said bent end portions and the center portion of said web being secured to said convex side of said central portion; a flexible securing means connected to opposite longitudinal sides of said plate member and including a belt terminating in buckling means for encircling said peripheral portion of said vehicle wheel to hold said concave side of said central bowed portion against said peripheral portion of said wheel with said transverse axis substantially parallel to the axis of rotation of said wheel, said bent end portions extending away from said wheel such that rotation of said wheel in either direction causes said wheel to be raised up by said concave side of said plate member.

2. A device according to claim 1, in which the end edges of said bent end portions are parallel to said transverse axis so that one of said edges can engage a flat base support positioned adjacent to said wheel to stabilize the raising of said wheel.

References Cited
UNITED STATES PATENTS

| | | | |
|---|---|---|---|
| 1,450,074 | 3/1923 | Green | 254—94 |
| 1,947,346 | 3/1934 | Lintern | 254—94 |
| 2,679,881 | 6/1954 | Gagne | 152—228 X |

OTHELL M. SIMPSON, *Primary Examiner.*